2,577,620

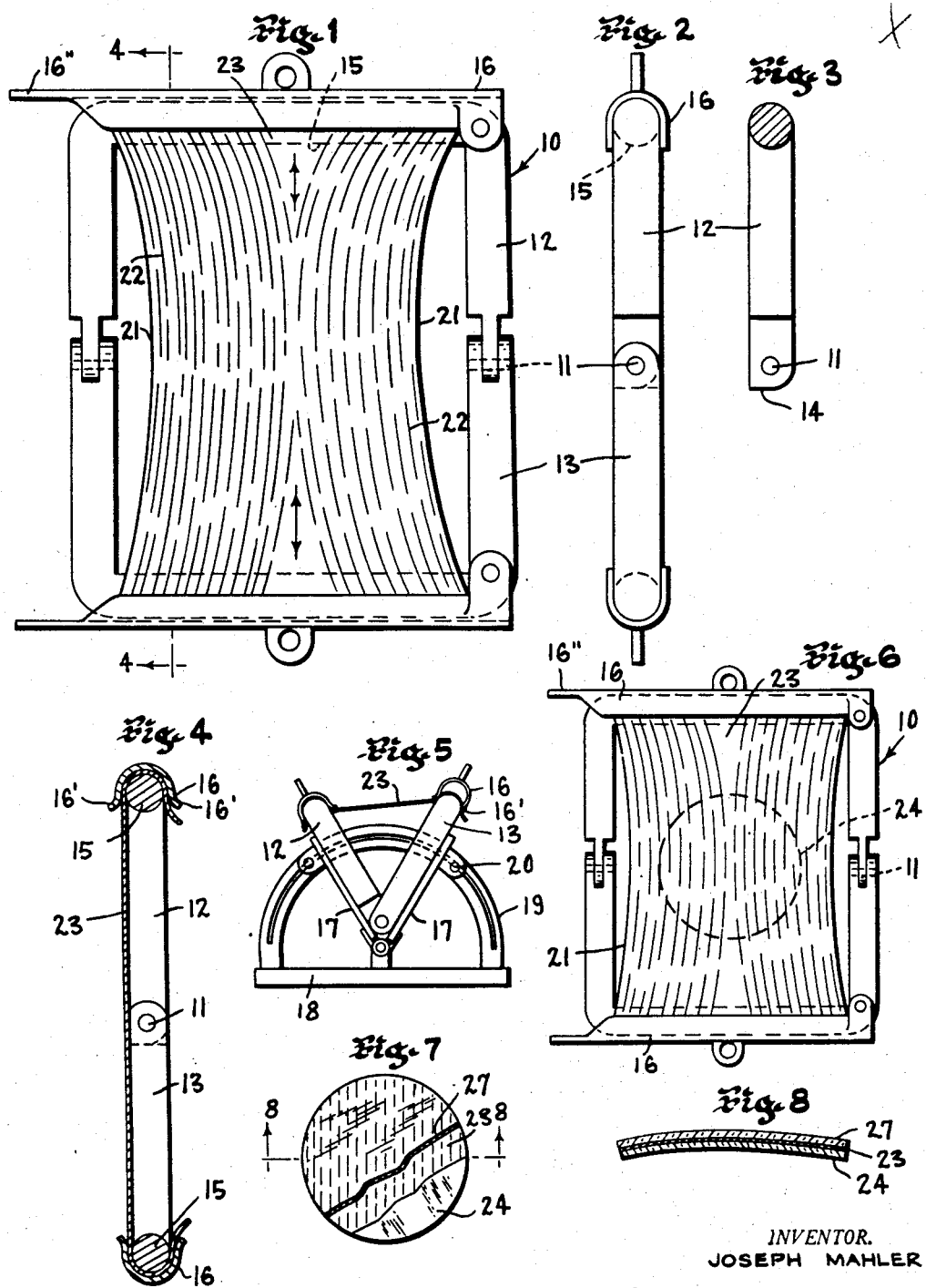
Dec. 4, 1951 — J. MAHLER — 2,577,620
LIGHT POLARIZER AND PROCESS OF MAKING THE SAME
Filed May 12, 1948 — 2 SHEETS—SHEET 1
INVENTOR.
JOSEPH MAHLER
BY
ATTORNEY Dec. 4, 1951           J. MAHLER           2,577,620
LIGHT POLARIZER AND PROCESS OF MAKING THE SAME
Filed May 12, 1948           2 SHEETS—SHEET 2
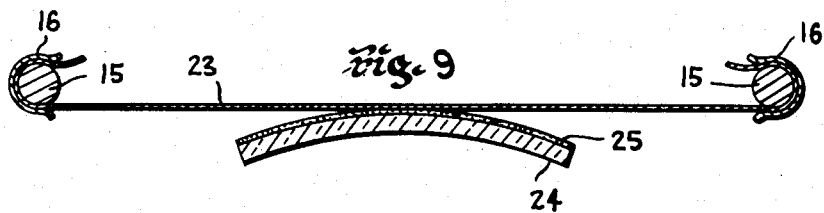
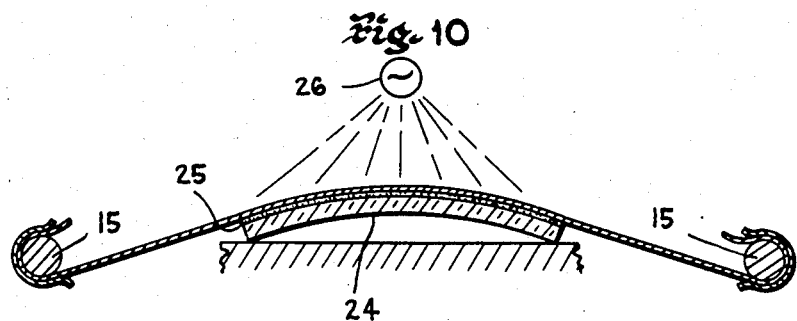
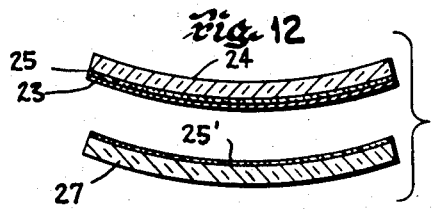
*INVENTOR.*
JOSEPH MAHLER
BY
*Louis L. Gagnon*
ATTORNEY Patented Dec. 4, 1951

UNITED STATES PATENT OFFICE 2,577,620

LIGHT POLARIZER AND PROCESS OF MAKING THE SAME

Joseph Mahler, Brookline, Mass., assignor to American Optical Company, Southbridge, Mass., a voluntary association of Massachusetts Application May 12, 1948, Serial No. 26,667

4 Claims. (Cl. 88—65)

This invention relates to light polarizers and more particularly to a curvilinear polarizer capable of lamination to a curved surface, such as an optical lens, and the process of making the same.

The present application is a continuation-in-part of my earlier filed application bearing Serial Number 704,413, and filed on October 19, 1946, now patent 2,515,830, issued July 18, 1950.

It is now well known that the molecules of certain groups of plastics, such as cellophane and polyvinyl alcohol, can be oriented into parallelism and, when such plastics so treated are stained with a polarizing dye, for example, a dichroic dye, a light polarizer is formed. The plastics aforesaid cannot be stretched to effect the orientation of the molecules thereof until they have been softened by heating. When a sheet of plastic is softened by heating and subsequently stretched to secure the desired orientation of its molecules, the plastic is likely to split in the direction in which it is stretched, which, of course, is the direction of the orientation of its molecules. For this reason, it is impossible to laminate such material to curved surfaces; in fact, the lamination thereof to flat surfaces is difficult and is successful only when great care is used.

In order to handle a film which has been stretched after heating, it is necessary to secure it to a film base, such as cellulose acetate or the like. A polarized film anchored to a base film cannot be laminated to a curved lens or between two curved lenses because the base, being stiff, does not readily assume the curvature of the lens or lenses or adhere thereto.

Another difficulty preventing the lamination of a polarizer having its molecules oriented in linear parallelism to a curved lens or between curved lenses is that a substantial distortion of the polarizer will result when it is forced out of its original plane surface to assume the configuration of the lens.

When a sheet of such plastics has been softened by heat and stretched to orient the molecules thereof, the surface of the film is hardened to such an extent that a dichroic dye cannot readily penetrate the surface thereof and if the time of treatment is extended in order to secure the necessary penetration, the distribution of the dye is not uniform even in small areas.

It is highly desirable that a polarized sun glass, if used by one whose vision is defective, should comprise optical glass lenses ground in accordance with the lenses of the spectacles worn by such user. If the user does not have defective vision requiring correction by spectacles, it is desirable that the polarized film of his sun glasses should be laminated to a curvilinear surface for the reason that when the polarizer is laminated to a plane surface, the glasses form a mirror which reflects into the user's eyes light impinging upon the rearward surface of the glasses.

It is therefore one of the objects of my invention to provide a curvilinear polarizer having such qualities that it is capable of lamination to a curvilinear surface without splitting.

Another object is to provide a lamination or sheet of polarized material having its molecules oriented curvilinearly, that is to say, one having its molecules oriented on both sides of its longitudinal axis, the orientation on each of the sides of the sheet being convex to that of the other.

Another object is to provide a sun glass lens, or other lens, comprising one or a pair of curvilinear lenses of optical glass having a plastic polarizer laminated to one such lens or interposed between a pair of lenses, such lenses eventually to be ground by an optician to fit the eyes of the user.

Another object is to provide a plastic the molecules of which may be oriented and stained to form a polarizer without first softening the same by heat.

Another object is to provide a process for producing a sheet of polyvinyl alcohol, cellophane or any other suitable plastic material which is substantially water insoluble, which has high flexibility when moistened, which is stretchable at a temperature even as low as 1° C., to orient its molecules, and which, when such molecules are oriented curvilinearly, is capable of application to, and will assume the shape of, a curved surface without splitting and can be bonded thereto by a suitable adhesive.

Other objects of my invention will appear from the detailed description of the particular embodiments thereof selected to explain the principles underlying the same.

In the drawings:

Figure 1 is a plan view of one form of device that may be used for stretching a film to orient the molecules thereof.

Fig. 2 is a side view of the same.

Fig. 3 is a side view partly in section of the upper side of said device.

Fig. 4 is a section taken on the line 4—4 of Fig. 1.

Fig. 5 is an elevation of one form of gauge that may be used with the stretching device.

Fig. 6 is a plan view on a smaller scale indicating a curvilinearly polarized film and the curvilinear lens to which it is to be laminated.

Fig. 7 is a plan view of two curvilinear lenses having a polarized firm laminated thereto.

Fig. 8 is a section on the line 8—8 of Fig. 7.

Figs. 9, 10, 11 and 12, are diagrams illustrating the several stages in the lamination of my polarizer between two curvilinear lenses.

I have found that when a sheet of polyvinyl alcohol or cellophane, each of which is water soluble, is treated with a suitable reagent in the manner hereinafter set forth, the physical characteristics of such sheet are so altered that the sheet is of low water solubility, in fact, practically water insoluble, has high flexibility when in moistened condition, is readily stretchable at "room" temperatures, (20° C.) or even at as low as 1° C., to orient its molecules and is capable of application to a curved surface, assuming the shape thereof without splitting in the direction of orientation and that said sheet, if stained with a dichroic or other suitable dye, becomes an efficient polarizer. It is to be understood, however, that I do not limit myself to the plastics above named.

I have found that suitable reagents for treating a sheet of polyvinyl alcohol are solutions of alali metal salts, such, for example, as a solution of sodium sulphate having a concentration of about 100 grams per liter of water or a solution of sodium phosphate (monobasic) or potassium phosphate (monobasic) of about the same concentration. While sodium sulphate (monobasic), sodium phosphate (monobasic) and sodium sulphate work particularly well, it is to be understood that my invention is not limited specifically to the use of these reagents, for resorcinol may also be used with good results.

The time of treatment of the sheet depends upon its thickness and the temperature of the bath, for example, for a sheet of plastic having a thickness of about .003 inch, and a bath temperature of about 1° C., the time of treatment will be about three minutes and if the temperature of the bath is about 20° C., such time will be about one minute. If the sheet is of greater thickness the time of treatment would be slightly longer.

If the plastic to be treated is cellophane, I prefer a caustic alkaline hydroxide, such, for example, as sodium hydroxide or potassium hydroxide, and such sheet so treated will have substantially the same characteristics as those above set forth with respect to polyvinyl alcohol.

A sheet of either of the materials treated as above will readily accept a dichroic or other suitable dye which will almost instantaneously distribute itself uniformly into the plastic after the molecules thereof have been oriented, thereby making a polarizer of the proper density and shade.

While at the present time I prefer sodium sulphate as a reagent for giving polyvinyl alcohol the properties outlined above, it is to be understood that sodium sulphate and potassium phosphate (monobasic) are full chemical equivalents, producing products which aside from their differences in degree of water solubility and acidity are full chemical equivalents and that sodium phosphate is the chemical equivalent of potassium phosphate, for this purpose.

When the molecules of the substances above described are oriented curvilinearly, there will be two sets of such oriented molecules, one on either side of the axis of stretch of the film; that is to say, the central longitudinal axis, if, as shown in Fig. 1, the film is stretched longitudinally, as indicated by the arrow, and the orientation on one of the sides of the film will be convex to that of the other.

I consider as embraced within the scope of my invention all other plastics which when treated with suitable reagents will be of low water solubility, high flexibility when in moistened condition, stretchable at a temperature as low as 1° C., or lower, for curvilinearly orienting their molecules in the manner above stated, and capable of lamination to a curvilinear surface and assuming the shape thereof without splitting in the direction of orientation.

There is shown in Fig. 1, a stretcher which I have found convenient for orienting the molecules of plastic sheets treated as above set forth. The stretcher comprises two flattened U-shaped members 10 hinged together in any suitable manner, as indicated at 11. In the present instance, the flattened lower ends of the side members 12 take into the bifurcated upper ends of the sides 13, and preferably, as indicated at 14, the conformation of the lower ends of said flattened portions is such that the two U-shaped members can be rotated to lie in the same plane, or only slightly beyond such plane. Pivoted to each of the cross bars, 15, near one end thereof, is a clamp 16, comprising an arcuate clip of spring material of substantially the same length as the cross bars and constructed to embrace and snap over the latter to securely hold the ends of the sheet to be treated to the cross bars. Each of said clips has a circumferential length slightly greater than 180°, and the outer edges thereof are flared outwardly, as shown at 16'. The free edge of each clip terminates in a finger piece 16" extending beyond the cross bars.

Any suitable holder may be employed to retain the stretcher in semi-closed position, preparatory to clamping the ends of a sheet plastic to the cross bars. In Fig. 5, I have shown such holder comprising the plates 17, which are pivoted to a bracket rising from the base 18. The angle between the plates which, of course, governs the angle between the side members of the stretcher having been determined, the plates may be clamped to the semi-circular guide 19 by screw 20. Having determined the degree of stretch of the film, the plates are set at the proper angle and the stretcher disposed in the holder between them as indicated in Fig. 5. The ends of the film are now placed over the bars 15 and firmly clamped thereto by the clips 16, one of which, in Fig. 5, is shown in open position. The stretcher will now be removed from the holder and immersed in the chemical bath above specified, and after remaining there the proper length of time, the side members of the stretcher will be rotated about their pivot until the two U-shaped members lie in the same plane.

As indicated by the lines 21, 21, the width of the film will be progressively reduced from its respective ends to its central portion. The direction of orientation of its molecules will be curvilinear, as indicated by the broken lines 22. The sheet, which is now extremely flexible, will bond to the convex surface of a lens, such as that shown at 24, a suitable adhesive or bonding material 25 having first been placed on said surface of the lens.

This may, preferably, be done by grasping the ends of the stretcher and placing the central portion of the surface of the film against the convex surface of said lens (Fig. 9) and then forcing the film down over said convex surface (Figs. 6 and 10). Thereafter, by an infra-red heat lamp 26, or other suitable heating means, the film and bonding material are quickly dried. The film is then removed from the frame and the portions extending beyond the periphery of the lens are trimmed off. A coating of bonding material 25' is now placed over the concave surface of the other lens 27 and the lens 24 with the film bonded thereto is pressed firmly down on the concave surface of the lens 27 (Fig. 12) thereby forming the laminated curvilinearly polarized lens shown in Figs. 7 and 8.

As indicated in Fig. 7 the curvilinear orientation obtained when the stretched surface of the film is substantially planary is changed to substantially linear parallel orientation when the film is laminated to the spherical curvature of the lens. Thus where the radius of curvature of the lens, and its diametrical dimension is known, by controlling the initial dimensions of the film, when in position on the stretcher, before stretching and the length of the stretcher, a desired curvilinear orientation of the molecules of the sheet may be obtained on stretching that will be transformed into an orientation in linear parallelism when said film is changed from a plane to the spherical curvature of the surface of the lens. For example, for a 50 mm. lens having a 6 diopter curve, which is the curvature of the usual sun-glass lens, I have found that a film of plastic having an initial width of about 3¾ inches when wet and stretched from an initial length of 1½ inches to a stretched length of 5 inches will have substantially linear parallel orientation of its molecules when laminated to a lens of such curvature. It is pointed out that when laminating an unstretched planary film to the curved surface of the lens, the orientation of the molecules is changed so that its axis of absorption is deformed from parallelism to a convex or O-shaped pattern. Applicant proposes to initially stretch the film so as to provide a concave pattern (lines of orientation having their convex sides disposed toward each other on either side of the axis of stretch of the film) on the film such that when the film is laminated to the lens this convex or O-shape pattern will not form but the convexly opposed lines will be deformed to linear parallelism. The film need only be of an initial width sufficient that the lines of orientation tangent to the opposed sides of the lens will be of the required curvature which will deform when the film is laminated to the curved surface of the lens to straight parallel lines. In obtaining this straight line parallelism of the resultant lines of orientation in the final curved article the amount of deformation present during the actual laminating of the film to the lens must also be considered. Thus in the example, the ends of the film held by the clips are moved downwardly about an inch from a plane position tangent to the center of the lens. This distance as well as the change in dimensions of the film by stretching will of course vary proportionately from the example given, according to the curvature of the surface to which the film is to be bonded. Almost any degree of curvilinear orientation may be initially obtained for the film by vaying its initial width and the amount of stretching. Likewise the amount of tension exerted on the film during the laminating process controls the accuracy of the resultant parallelism. The important feature is that sufficient control be exercised so that the lines of orientation are initially so convexly disposed to each other on either side of the axis of stretch that when laminated to the curved shape of the lens said lines assume straight linear parallelism and do not assume a concave relation with each other on opposed sides of said axis of stretch so as to provide an open area free of orientation adjacent the center of the lens.

Having thus described illustrative embodiments of my invention without, however, limiting the same thereto, what I claim and desire to secure by Letters Patent is:

1. A molecularly oriented sheet of transparent plastic material comprising a stretched sheet of plastic having when disposed in a substantially plane shape its molecules linearly oriented so that on opposite sides of a centrally disposed axis the directions of orientation of the molecules assume a uniform and convexly curved linear relation on each side of said central axis, with the curved linear relation on the same side of said axis being disposed substantially parallel, said convexities on the opposed sides of said central axis being toward each other, said sheet being adapted to be subsequently formed to a substantially meniscus shape, and the amount of convexity of said orientation of the molecules being controlled according to the steepness of meniscus shape which it is adapted to assume whereby the direction of orientation of said molecules on both sides of said central axis when the sheet is in said meniscus shape will have a substantially straight line parallel relation with each other.

2. A molecularly oriented sheet of transparent plastic material comprising a dyed and stretched sheet of plastic having when disposed in a substantially plane shape its molecules linearly oriented so that on opposite sides of a centrally disposed axis the directions of orientation of the molecules assume a uniform and convexly curved linear relation on each side of said central axis, with the curved linear relation on the same side of said axis being disposed substantially parallel, said convexities on the opposed sides of said central axis being toward each other, said sheet being adapted to be subsequently formed to a substantially meniscus shape, and the amount of convexity of said orientation of the molecules being controlled according to the steepness of meniscus shape which it is adapted to assume whereby the direction of orientation of said molecules on both sides of said central axis when the sheet is in said meniscus shape will have a substantially straight line parallel relation with each other.

3. The process of forming a light polarizer of the character described comprising rendering a sheet of plastic material of substantially uniform width stretchable at room temperature, stretching said sheet only in a direction perpendicular to its width and intermediate given spaced locations to cause the molecules thereof to assume a uniform and convexly curved linear relation on opposite sides of a central axis and disposed in the direction of stretching and to simultaneously cause said molecules to assume a substantially parallel relation on each side of said central axis with the convexities on said opposed sides of said axis being disposed toward each other, causing said sheet to assume a substantially intimate fit with a cup-shaped surface of a transparent element and securing said sheet to said element in said relation, the convex relation of said molecules of the plastic sheet being so controlled in said stretching step according to the curvature of said cup-shaped surface whereby the molecules of the sheet on the opposed sides of said central axis of the completed light polarizer will appear to be in substantially linear parallelism with said axis when viewed perpendicularly to the surface of said transparent element.

4. The process according to claim 3 including the step of incorporating a dichroic stain with the sheet.

JOSEPH MAHLER.

REFERENCES CITED

The following references are of record in the file of this patent:

UNITED STATES PATENTS

| Number | Name | Date |
| --- | --- | --- |
| 2,236,972 | Kasemann | Apr. 1, 1941 |
| 2,237,567 | Land | Apr. 8, 1941 |
| 2,255,940 | Rogers | Sept. 16, 1941 |
| 2,263,249 | Rogers | Nov. 18, 1941 |
| 2,284,590 | Rogers | May 26, 1942 |
| 2,320,375 | Moulton | June 1, 1943 |
| 2,328,219 | Land | Aug. 31, 1943 |
| 2,432,867 | Dreyer | Dec. 16, 1947 |
| 2,454,515 | Land | Nov. 23, 1948 |

FOREIGN PATENTS

| Number | Country | Date |
| --- | --- | --- |
| 497,373 | Great Britain | June 9, 1938 |